L. F. BLUME.
PHASE TRANSFORMATION.
APPLICATION FILED OCT. 17, 1912.

1,188,145.

Patented June 20, 1916.

Witnesses

Inventor:
Louis F. Blume
By
His Attorney

UNITED STATES PATENT OFFICE.

LOUIS F. BLUME, OF PITTSFIELD, MASSACHUSETTS, ASSIGNOR TO GENERAL ELECTRIC COMPANY, A CORPORATION OF NEW YORK.

PHASE TRANSFORMATION.

1,188,145.  Specification of Letters Patent.  Patented June 20, 1916.

Application filed October 17, 1912. Serial No. 726,200.

*To all whom it may concern:*

Be it known that I, LOUIS F. BLUME, a citizen of the United States, residing at Pittsfield, county of Berkshire, State of Massachusetts, have invented certain new and useful Improvements in Phase Transformation, of which the following is a specification.

My invention relates broadly to phase transformation, and the objects of my invention are to provide an efficient means and method of deriving from currents and electromotive forces having a certain phase relation, currents and electromotive forces having other phase relations.

More specifically the objects of my invention are to provide a method and means of transforming from three phases to two phases, or vice versa, whereby two phase and three phase currents may be obtained from four conductors.

My method and means will be understood from the detailed description and from the accompanying drawings which form a part of this specification.

Figure 1:
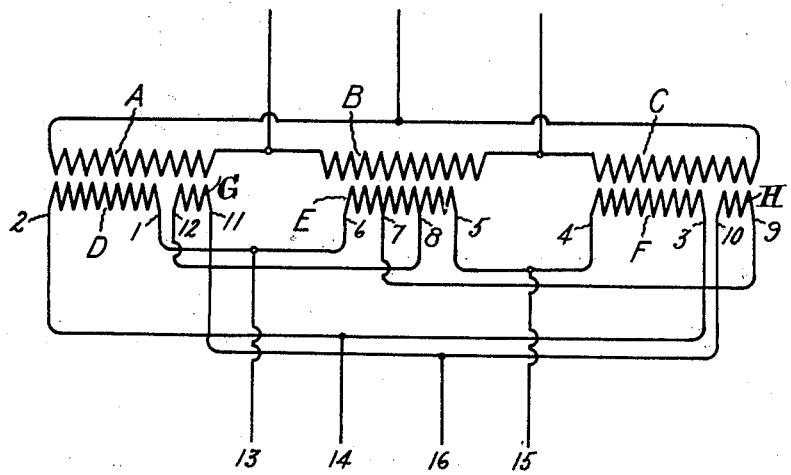
Figure 2:
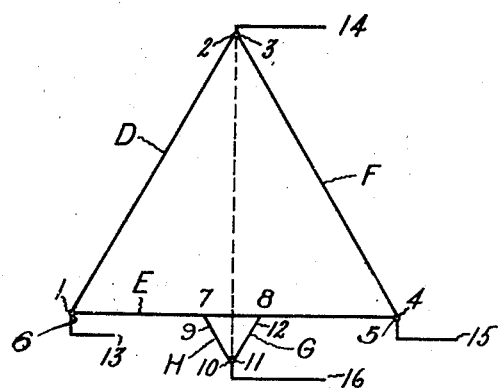

Figure 1 illustrates diagrammatically a connection of the windings of three single-phase transformers, or a single three-phase transformer, whereby either two or three phase currents or both simultaneously may be derived from three phase currents, or two sets of three phase currents may be derived from two phase currents. Fig. 2 shows the phase relations of the electromotive forces.

In Fig. 1, A, B and C are three transformer windings which, for the purpose of this description, may be regarded as the primary windings and which may be connected in delta or in Y. Inductively related to each of these primary windings is a secondary winding D, E, F; the ratios of the numbers of turns of the primaries and secondaries of the different sets are equal. Inductively related to two of the primaries, for example A and C, are two other secondary windings G and H which, however, are not connected to the main secondaries but are on the same cores. The primary winding A, B and C are shown connected in delta.

The connection of the secondary windings will be better understood by reference to Fig. 2. The reference characters on Fig. 2 serve to indicate the connections of the secondary windings of Fig. 1. It will be seen that the windings D, E, F are connected in delta, the terminal 2 being joined to the terminal 3, the terminal 1 to the terminal 6 and the terminal 4 to the terminal 5. To these junction points are connected the line conductors 13, 14 and 15. Since the electromotive forces impressed on the primaries are three-phase, the electromotive forces in the secondaries are three-phase, and hence three-phase electromotive forces are impressed on the line conductors 13, 14 and 15. The auxiliary secondary windings G and H preferably bear the same ratio to each other as do their primaries to each other and hence the electromotive forces in these two windings are equal. At the same distance from the center point of the winding E are located the taps 7 and 8 between which exists an electromotive force equal to the electromotive force in each G and H. These three portions are connected in delta in the manner shown in Fig. 2, that is, the terminals 10 and 11 are connected together, the terminal 9 is connected to the tap 7 and the terminal 12 to the tap 8. To the connection between the terminals 10 and 11 is connected the line conductor 16.

The two triangles have been joined at their bases and with the centers of their bases coinciding. It will be apparent, therefore, that the electromotive force between the conductors 14 and 16, represented by the dash line, is at right angles to the electromotive force between the conductors 13 and 15. By preference the auxiliary secondary windings G and H have been supposed to be constructed of such a number of turns, and connected at such points on the winding E, that the resultant electromotive force between the conductors 14 and 16 is equal in value to the electromotive force of one side of the larger triangle, that is, for example, equal to the electromotive force between the conductors 13 and 15.

It will be apparent from an inspection of Fig. 2, that the electromotive forces between the conductors 14 and 16 and between 13 and 15 bear a two phase relation to each other and that the electromotive forces between the three conductors 13, 14 and 15 bear a three-phase relation to each other.

The method of transformation will be apparent from the preceding description of a particular means employed for carrying out the method. Both the method and means may be modified to obtain other relations of phase and value of electromotive force by utilizing other triangular forms and by joining the triangles otherwise than with the centers of their bases coinciding. Such possible variations are infinite in number, but all of such variations will be apparent from the preceding description and the drawings.

What I claim as new and desire to secure by Letters Patent of the United States, is:

1. The method of deriving from a three phase system, an electromotive force equal to the electromotive force of one of the phases of said system and ninety degrees displaced in phase therefrom, which consists in combining the electromotive forces of the three phase system so that their vector representation consists of two unequal equilateral triangles joined at their bases, the centers of the bases coinciding, the two triangles being of such sizes that the distance between the two apexes is equal to the base of the larger triangle.

2. The method of phase transformation which consists in combining an electromotive force common to a three phase system and a two phase system, with the remaining two electromotive forces of the three phases so that the vector representation of the three electromotive forces consists of two unequal equilateral triangles joined at their bases, the centers of the bases coinciding.

3. The method of phase transformation which consists in combining an electromotive force common to a three phase system and a two phase system, with the remaining two electromotive forces of the three phases so that the vector representation of the three electromotive forces consists of two unequal equilateral triangles joined at their bases, the centers of the bases coinciding, and the two triangles being of such sizes that the distance between the two apexes is equal to the base of the larger triangle.

4. In a system of phase transformation, the combination of a winding, two windings connected in triangular relation to the ends of the first, two other windings connected in triangular relation to an intermediate portion of the first, and a system of multiphase mains, two of which are connected to the terminals of the first-mentioned winding and two of which are connected to the apexes of the triangles.

5. In a system of phase transformation, the combination of a winding, two similar windings connected in delta relation to the ends of the first, two other windings connected in delta relation to an intermediate portion of the first, and a system of multiphase mains, two of which are connected to the terminals of the first-mentioned winding and two of which are connected to the apexes of the deltas.

In witness whereof, I have hereunto set my hand this, 14th, day of Oct., 1912.

LOUIS F. BLUME.

Witnesses:
A. B. NUGENT,
C. D. MEIG.